Figure 1:
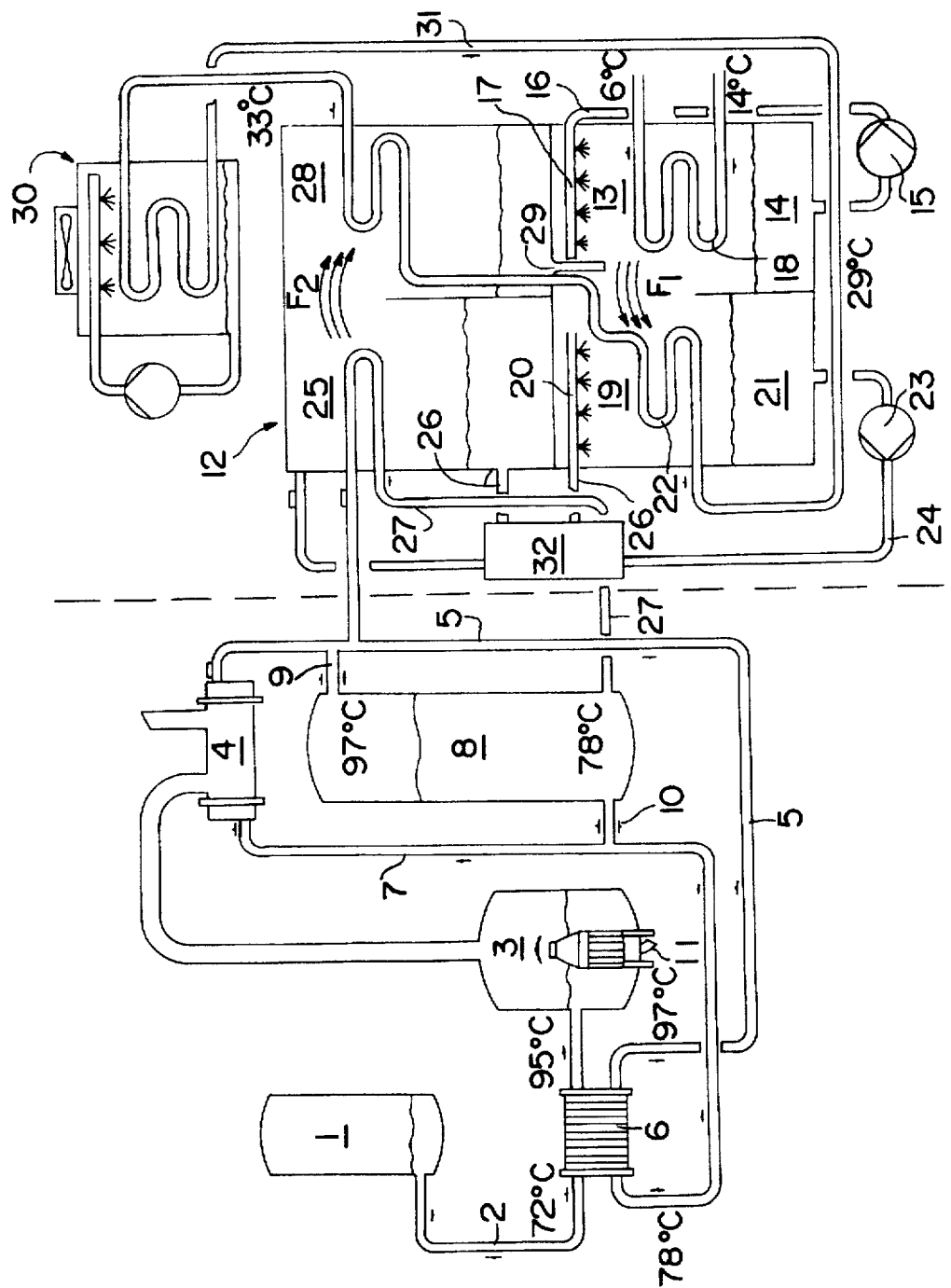

United States Patent [19]
Lenz et al.

[11] Patent Number: 5,787,720
[45] Date of Patent: Aug. 4, 1998

[54] METHOD AND DEVICE FOR PRE-COOLING BREWING LIQUOR

[75] Inventors: Bernhard Lenz, Heinrich-Huppmann-Str. 1, D-97318 Kitzingen; Wolfgang Felgentraeger, Wiesentheid, both of Germany

[73] Assignee: Bernhard Lenz, Kitzingen, Germany

[21] Appl. No.: 590,492

[22] Filed: Jan. 24, 1996

[30] Foreign Application Priority Data

Jan. 25, 1995 [DE] Germany .................. 195 02 263.7

[51] Int. Cl.⁶ .................. C12C 7/26; F25B 27/00
[52] U.S. Cl. .................. 62/238.3; 62/476
[58] Field of Search .................. 62/101, 238.3, 62/476, 489

[56] References Cited

U.S. PATENT DOCUMENTS

| | | | |
|---|---|---|---|
| 3,203,875 | 8/1965 | Sturtevant | 62/238.3 |
| 4,251,997 | 2/1981 | Newton | 62/101 |
| 4,333,515 | 6/1982 | Wilkinson et al. | 62/101 |
| 4,780,967 | 11/1988 | Mucic | 62/238.3 |
| 5,271,235 | 12/1993 | Phillips et al. | 62/101 |

*Primary Examiner*—William Doerrler
*Attorney, Agent, or Firm*—Laff, Whitesel, Conte and Saret, Ltd.; Larry L. Saret

[57] ABSTRACT

The invention relates to a device and a method for pre-cooling brewing liquor using a refrigeration device, the said refrigeration device being designed as an absorption-type refrigeration device, and preferably as a LiBr absorption-type refrigeration device, with an evaporator, an absorber, a generator and a condenser, and the generator being operated with surplus process heat produced in the brewery. Use is preferably made of the water vapour heat which is recovered in the copper vapour condenser and which can be subjected to intermediate storage in an energy reservoir.

4 Claims, 1 Drawing Sheet

METHOD AND DEVICE FOR PRE-COOLING BREWING LIQUOR

DESCRIPTION

The invention relates to a method and a device for pre-cooling brewing liquor using a refrigeration device.

After being boiled in the wort copper, the beer wort obtained during the brewing process is cooled down, before being conducted into the fermenting container or containers, from a temperature of up to 100° C. or more to the so-called "pitching temperature". As a rule, the latter lies between 4° C. (bottom-fermented beers) and 18° C. (top-fermented beers), depending upon the desired fermenting process. Generally speaking, it has very recently been possible to observe, in many breweries, a rise in the fermenting temperature and also, linked with it, a rise in the pitching temperature, in order to accelerate the fermenting process. For the purpose of cooling-down the wort to the pitching temperature, use is normally made of cold brewing liquor, which is heated up to about 80° C. in the process.

Two-stage or multi-stage cooling of the wort is known from the prior art. Under these circumstances, the wort coming from the wort copper is cooled in a suitably dimensioned cooler, in a first stage, with cold brewing liquor in a range between about 10° and 30° C., to a temperature about 3° to 60° C. above the inlet temperature of the brewing liquor. There then occurs, in a second stage, the further cooling-down of the wort to the desired pitching temperature via a suitable refrigeration-carrier medium which has been cooled in a central refrigeration device, as a rule a compression-type refrigeration device, to the working temperature, which lies suitably below the pitching temperature. A particular disadvantage in this known cooling process is the fact that the energy costs for the electrical driving energy for operating the compression-type refrigeration device are considerable, the said driving energy also having to be available within the relatively short space of time for which the wort is cooled, which is 45 to 60 minutes as a rule.

Single-stage cooling of the wort is also known, in which the brewing liquor is continuously cooled by means of the compression-type refrigeration device to a temperature of about 2° to 4° C. below the pitching temperature throughout the brewing period, which is 3 to 4 hours as a rule. The brewing liquor pre-cooled in this way is then subjected to intermediate storage in a so-called "ice water tank" until the wort is cooled. Even though cost-intensive energy peaks are reduced in this known process, a not inconsiderable input of energy is still necessary for operating the compression-type refrigeration device.

Adopting this prior art as the starting point, the object of the present invention is to provide a method and a device for pre-cooling brewing liquor, which reduce the input of additional energy, particularly electrical driving energy, and increase the economic efficiency.

This object is achieved through a process and through a device as described herein.

The sub-claims relate to advantageous refinements of the invention.

The invention is based, first of all, on the knowledge that process heat is produced in excess in many breweries. Under these circumstances, the said process heat may be available, for example, in the form of waste heat, whether linked to hot water or to steam as the carrier medium, from a block-type heating power station. In many breweries, a large portion of the surplus process heat is produced when the wort is boiled.

In these cases, however, the heat contained in the water vapours is already regularly recovered, at least partially, in the copper vapour condenser and used, above all, for the regenerative pre-heating of the wort. Depending upon the boiling process used, however, more water vapours and therefore surplus, recoverable, process heat are often produced, than can be used for pre-heating the wort.

The essential idea of the present invention is now to use, instead of the compression-type refrigeration devices previously used in the brewery sector, which have a considerable electrical current consumption, an absorption-type refrigeration device with an evaporator, an absorber, a generator and a condenser, and to operate the generator of the absorption-type refrigeration device, in which generator the refrigerant is evaporated, that is to say is brought to a higher temperature/pressure level, with surplus process heat produced in the brewery.

In principle, any desired refrigerant/absorbent pair of working media may be chosen, depending upon the temperatures of the brewing liquor available and upon the desired pitching temperature for the wort, which requires a brewing liquor temperature which is about 2° to 5° C. below the said pitching temperature. Thus, for example, use may be made of the ammonia/water ($NH_3/H_2O$) pair of working media, with ammonia serving as the refrigerant and water as the absorbent. With particular regard to the cooling capacity necessary for cooling brewing liquor with a starting temperature of between about 10° and 30° C. and a pitching temperature higher than 6° C., and also to the hot water which is available from the copper vapour condenser and which is, as a rule, at between 95° and 105° C., use may preferably be made of water as the refrigerant in the absorption-type refrigeration device, and of a hygroscopic material, particularly a salt, as the absorbent.

According to a particularly preferred exemplified embodiment, the salt is a lithium bromide salt (LiBr). An absorption-type refrigeration installation with the water/lithium bromide ($H_2O/LiBr$) pair of working media is known from airconditioning technology. With an absorption-type refrigeration installation of this kind, it is possible to cool down brewing liquor with a starting temperature of between 10° and 30° C. to less than 5° C. without any problems.

According to one exemplified embodiment, the heat of solution produced in the absorber and the heat produced in the condenser from condensation of the refrigerant are conducted away via a separate coolant circuit. The latter is preferably a separate coolant circuit, the cooling water heated up in the absorber and condenser being subsequently fed to a separate cooling arrangement, for example a known cooling tower, for cooling-down purposes.

According to a further exemplified embodiment of the invention, the dilute salt solution obtained in the absorber and the concentrated salt solution obtained in the generator through evaporation of the refrigerant are conducted, preferably in counter-current, through a heat-exchanger, part of the heat contained in the concentrated salt solution being transferred to the dilute salt solution in such a way as to pre-heat the latter and thereby increase the efficiency, in particular, of the generator.

Even though it is possible in principle, as described above, to use any kind of surplus process heat produced in the brewery for operating the generator of the absorption-type refrigerating device, nevertheless hot water from the copper vapour condenser of a wort copper is preferably used, according to the invention, as the process heat.

Under these circumstances, it is possible in principle to directly tap off the hot water from the copper vapour condenser into the generator of the absorption-type refrigeration device; according to a particularly preferred exemplified embodiment, however, the hot water coming from the copper vapour condenser is subjected to intermediate storage in an energy reservoir before being used in the absorption-type refrigeration installation. Under these circumstances, the said energy reservoir is preferably constructed as a stratified reservoir.

According to the invention, a particularly preferred device for pre-cooling brewing liquor with a refrigeration installation has at least one copper vapour condenser, in which the water vapours occurring in the wort copper during the boiling of the wort are condensed, while giving off their inherent heat of condensation to a heat-carrier medium, particularly water, and has an absorption-type refrigeration device with an evaporator, an absorber, a generator and a condenser, the copper vapour condenser and the generator of the absorption-type refrigeration device being indirectly or directly coupled in such a way that the heat-carrier medium heated up in the copper vapour condenser is used for expelling the refrigerant vapour in the generator.

According to a particularly preferred refinement, the device has an energy reservoir, which is arranged between the copper vapour condenser and the generator, for the intermediate storage of the heat-carrier medium which has been heated up in the copper vapour condenser and/or of the heat-carrier medium which has been cooled down after passing through the generator. As a result of this, buffering of the energy requirement of the generator of the absorption-type refrigeration device is effected in a simple and advantageous manner.

The invention is explained in greater detail below with the aid of a drawing representing only one exemplified embodiment. The single FIGURE shows, in a schematic, block diagram-like representation, a device according to the invention for performing the method according to the invention.

The brewhouse area of a brewery is represented, in purely schematic form, in the left-hand half of the representation in FIG. 1. Pre-heated wort is conducted from a first-runnings tank 1 for the wort via a pipeline 2 into the wort copper 3, where it is boiled. Under these circumstances, the boiling temperature of the wort in the wort copper is as high as 100° C. or above, depending upon the boiling process chosen, and particularly upon the pressure conditions prevailing therein. A considerable portion of the water located in the wort is evaporated in the process. Under these circumstances, the evaporation may, again depending upon the boiling process used, amount to about 5 to 15%/hl of reject wort. These water vapours are fed to a copper vapour condenser 4 in which it is possible, by condensation of the water vapours, to recover a considerable portion of the waste heat contained in the said water vapours by the exchange of heat with, or giving-off of heat to, water which is heated in the process. In the present example, water is heated in the copper vapour condenser 4 to about 97° C. and is fed, via the pipeline 5, to a wort-heater 6 constructed as a heat-exchanger. Under these circumstances, in counter-current to the wort coming from the wort first-runnings tank, the latter is heated up in the wort-heater 6 to about 95° C., the water at 97° being cooled down to about 78° C. and fed via the pipeline 7 to the copper vapour condenser 4 for renewed heating.

According to the present exemplified embodiment, an energy reservoir 8 designed as a stratified storage tank is provided for storing the waste heat of the water vapour condensate, which heat is produced, essentially, over the entire duration of brewing. Under these circumstances, the water at 97° is conducted via the pipeline 9 into the energy reservoir 8, or removed again if required. The water at 78° coming from the wort-heater 6 can likewise be subjected to intermediate storage in the energy reservoir 8 via the pipeline 10, it being possible, via the same pipeline 10, to feed the water at 78° located in the lower part of the energy reservoir 8 designed as a stratified reservoir, to the copper vapour condenser 4 via the pipeline 7 for renewed heating.

After the boiling operation is completed, the wort located in the wort copper 3 is drawn off via an outlet connection 11 and fed, after cooling-down to the desired pitching temperature, to a fermenting container which is not represented. In the exemplified embodiment represented here, cooling-down to the pitching temperature is effected in a single stage by means of suitably prepared brewing liquor which is cooled to a temperature which is about 2° to 4° C. below the desired pitching temperature. Under these circumstances, the cooling-down of the brewing liquor is effected in the absorption-type refrigerating device 12 represented in the right-hand half of the FIGURE. The absorption-type refrigeration device 12 represented in accordance with the present exemplified embodiment is an $H_2O$/LiBr absorption-type refrigeration machine which is known from air-conditioning technology and in which water is used as the refrigerant and the salt lithium bromide as the absorbent. The absorption-type refrigeration device 12 has, in a manner known per se, four stations which are arranged in separate chambers.

In the evaporator 13, which is arranged in the lower right-hand chamber, the water 14 acting as the refrigerant is sprayed via a nozzle system 17 by means of a refrigerant pump 15 which conducts the water 14 via a pipeline 16 into the upper part of the chamber. Because of the lower pressure of bout 8 mbar prevailing in the evaporator, the water 14 evaporates, under these circumstances, at low temperatures and, in doing so, cools to about 6° C. the brewing liquor which is fed in at about 14° C. and is conducted through the evaporator in a suitable line 18.

The refrigerant vapour, that is to say the steam, then passes, as is indicated by the arrows $F_1$, into the lower left-hand chamber in which the absorber 19 is arranged. In the absorber 19, a relative highly concentrated salt solution, that is to say, in the exemplified embodiment represented, a highly concentrated lithium bromide solution which has a strongly hygroscopic action, is sprayed via a spray nozzle system 20. Because of this hygroscopic property, the steam coming from the evaporator 13 is absorbed in the absorber 19 while forming a dilute lithium bromide salt solution which collects at the bottom of the absorber 19. The heat of solution released in the process is conducted away, after the exchange of heat, via a cooling water line 22.

The dilute lithium bromide salt solution is conducted, by means of a salt solution pump 23, via a pipeline 24 into the left-hand upper chamber of the absorption-type refrigeration installation 12, in which the generator 25 is constructed. Under these circumstances, the lithium bromide salt solution, which is dilute because of the steam absorbed, is "boiled out" in the generator 25. This means, in other words, that the water contained in the absorbent is evaporated again in the generator 25 with the feeding-in of hot water at 97° from the copper vapour condenser 4 or the energy reservoir 8, the salt solution, which is strongly concentrated as a result, being collected in the lower region of the generator 25 and being conducted back to the absorber 19 again via the pipeline 26. In the course of this "boiling-out" of the steam from the dilute salt solution, the temperature of the hot water coming from the copper vapour condenser 4 or the energy reservoir 8 is reduced, according to the present exemplified embodiment, to about 78°, the water cooled down in this way being conducted back to the energy reservoir 8 via the pipeline 27.

The steam expelled in the generator 25 passes, as is schematically represented by the arrows $F_2$, into the condenser 28 or liquefier and is there condensed with the giving-off of heat. The released heat of condensation is conducted away, in the exemplified embodiment represented, via the cooling water line 22 coming from the absorber 19. The condensed water is collected at the bottom of the condenser 28 and fed to the evaporator 13 again via a line 29. The refrigerant circuit is thus closed.

After leaving the condenser 28, the cooling water circulating in the cooling water line 22 is fed to a separate cooling arrangement, for example a conventional cooling tower 30, where it is cooled down, in the present exemplified embodiment, from about 33° C. to about 29° C. The cooling water is then fed back to the absorber 19 again via the pipeline 31.

In order to improve the efficiency of the absorption-type refrigeration device 12, there is arranged in the pipeline 24, in which the dilute salt solution is pumped from the absorber 19 to the generator 25, a heat-exchanger 32 in which the concentrated salt solution heated up by the hot water coming from the copper vapour condenser 4 or the energy reservoir 8 is conducted in counter-current to the dilute salt solution at a low temperature, with the giving-off of heat. In the process, the concentrated salt solution is cooled down, while the dilute salt solution is simultaneously heated up. That surplus heat in the concentrated salt solution which cannot be transferred, in the heat-exchanger 32, to the dilute salt solution is at least partially conducted away in the absorber 19, likewise through the cooling water line 22.

We claim:

1. Method for pre-cooling brewing liquor comprising: using a refrigeration device wherein the refrigeration device is an absorption-type refrigeration device (12) with an evaporator (13), an absorber (19), a generator (25) and a condenser (28), and operating said generator by feeding in to it surplus process heat produced in a brewery, said process heat derived by using hot water from a copper vapour condenser (4) of a wort copper (3).

2. Method according to claim 1, further comprising subjecting the hot water to intermediate storage in an energy reservoir (8) before using it in the absorption-type refrigeration device (12).

3. Device for pre-cooling brewing liquor with a refrigeration device, comprising: a wort copper (3) for boiling wort, at least one copper vapour condenser (4), in which the water vapours occurring in the wort copper (3) during the boiling of the wort are condensed, while giving off their inherent heat of condensation to a heat-carrier medium, an absorption-type refrigeration device (12), the refrigeration device (12) having an evaporator (13), an absorber (19), a generator (25) and a condenser (28), the copper vapour condenser (4) and the generator (25) of the absorption-type refrigeration device (12) being coupled in such a way that the heat-carrier medium heated up in the copper vapour condenser (4) is used for expelling the refrigerant vapour in the generator (25).

4. Device according to claim 3, further comprising an energy reservoir (8), which is arranged between the copper vapour condenser (4) and the generator (25), for the intermediate storage of the heat-carrier medium which has been heated up in the copper vapour condenser (4) or of the heat-carrier medium which has been cooled down after passing through the generator (25).

* * * * *